W. JOHN.
Tire-Setting and Cooling Apparatus.
No. 204,738. Patented June 11, 1878.
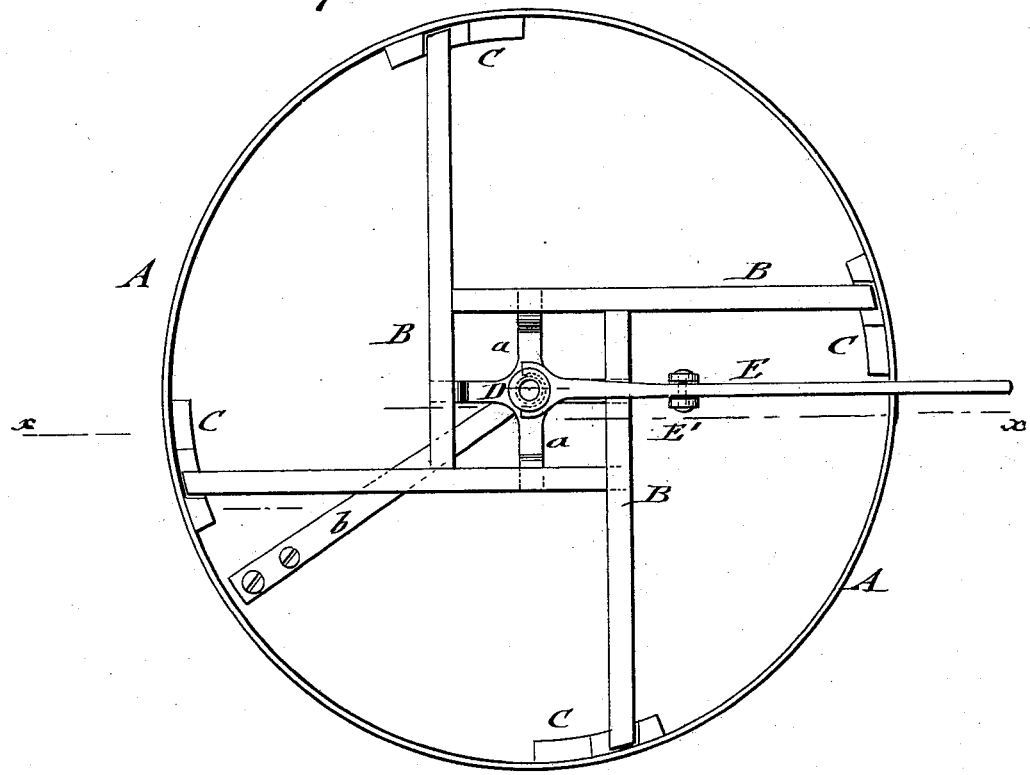
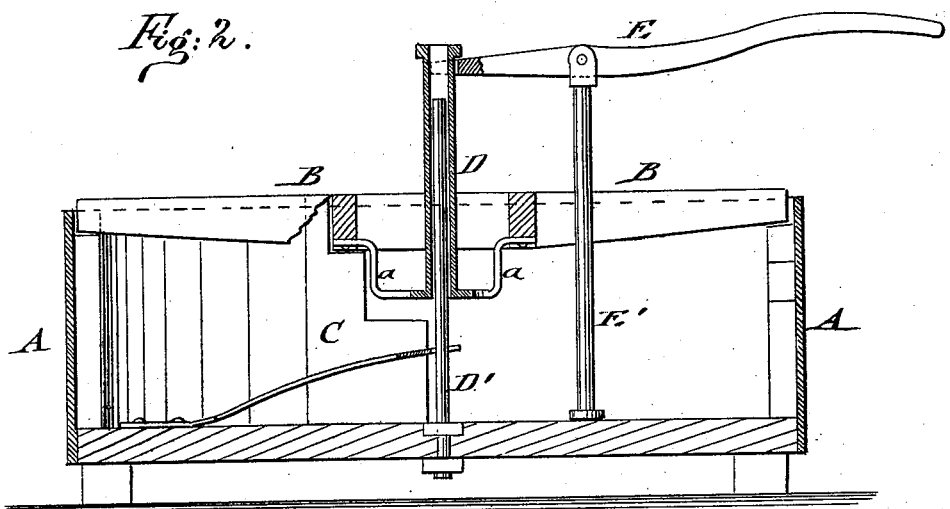
WITNESSES:
INVENTOR:
W. John
BY
ATTORNEYS.

UNITED STATES PATENT OFFICE.

WILLIAM JOHN, OF RIGDON, INDIANA.

IMPROVEMENT IN TIRE SETTING AND COOLING APPARATUS.

Specification forming part of Letters Patent No. 204,738, dated June 11, 1878; application filed January 3, 1878.

*To all whom it may concern:*

Be it known that I, WILLIAM JOHN, of Rigdon, in the county of Grant and State of Indiana, have invented a new and Improved Apparatus for Cooling and Setting Tires, of which the following is a specification:

In the accompanying drawing, Figure 1 represents a top view, and Fig. 2 a vertical central section on line $x\,x$, Fig. 1, of my improved apparatus for cooling and setting tires.

Similar letters of reference indicate corresponding parts.

This invention has for its object to provide for the purpose of cooling and setting tires an improved apparatus, by which the tire may be set by one person in easy, quick, and accurate manner without burning the fellies, and without straining the wheel by the unequal cooling of the tire.

The invention consists of a tank having step-shaped supports for a vertically-adjustable and axially-turning frame, on which the wheel is placed with the hub on a fixed center guide-sleeve of the frame. The heated tire is placed around the frame and lowered with the wheel into the tank, so as to shrink evenly on the same.

Referring to the drawing, A represents a tank, made about five feet in diameter, one foot deep, and either of wood or metal, as desired.

B is a wooden frame or trestle that extends by its arms to the circumference of the tank, and is supported on step-shaped rests C, secured at the inside of the rim of the tank. The center portion of the trestle-frame B is attached to iron arms $a$, that branch out from a center sleeve, D, which is guided on a fixed vertical center post, D', of tank A.

The frame B and center sleeve D may be raised by means of a forked lever, E, taking hold of a top collar of sleeve D. The forked lever E is fulcrumed to a movable post, E', that rests on the bottom of the tank when the lever is used, and is removed with the same when not in use.

A band-spring, $b$, attached to the bottom of the tank, presses on the lower part of the center sleeve D when the frame has been lowered into the water, so as to facilitate the raising of the same.

The apparatus is operated as follows: The wooden frame is placed on the highest steps of the rests or supports of the tank, and the tank filled with water. The wheel is then placed on the frame with the center post passing up through the hub. The heated tire is then dropped around the wheel, and the lever and supporting-post set in position in the tank, and the forked end of the lever applied to the collar of the sleeve. The frame and wheel are then raised by pressing down the end of the lever with one hand and the frame turned at the same time with the other hand, so as to clear the upper steps. The lever is then let up, and thereby the frame and wheel lowered into the water until supported on the lower steps of the rests. Thus all parts of the tire are introduced simultaneously into the water, and thereby the burning of the fellies on one side while the other is cooling avoided.

The drawing of the tire at one side of the wheel by the cooling of the other side, and the tendency to draw back again as that side shrinks, and the consequent straining of the wheel, will entirely be dispensed with by my apparatus. The top of the wheel-supporting frame has to be plated with iron at the ends to prevent the hot tire from burning it at the points of contact therewith.

Having thus described my invention, I claim as new and desire to secure by Letters Patent—

The combination of tank A, having step-shaped supports or rests C at the circumference, and a center guide-post, D', with a wheel-supporting trestle-frame, B, having center guide-sleeve D, and with a detachable lever and post for raising and lowering frame, substantially as and for the purpose specified.

WILLIAM JOHN.

Witnesses:
ZACHARIAH PARRISH,
ANDREW GEMMILL.